United States Patent [19]

Medvick et al.

[11] Patent Number: 4,665,943
[45] Date of Patent: May 19, 1987

[54] POPPET VALVE

[75] Inventors: Richard J. Medvick, Shaker Heights; Ross L. Wagner, Akron, both of Ohio

[73] Assignee: Swagelok Company, Hudson, Ohio

[21] Appl. No.: 829,228

[22] Filed: Feb. 14, 1986

[51] Int. Cl.⁴ ............................................. F16K 15/00
[52] U.S. Cl. ................................. 137/543.17; 251/337
[58] Field of Search ................... 137/540, 543, 543.17, 137/614.03, 614.04; 251/337

[56] References Cited

U.S. PATENT DOCUMENTS

| | | | |
|---|---|---|---|
| 2,481,713 | 9/1949 | Bertea. | |
| 3,052,488 | 9/1962 | Bruning | 137/614.04 X |
| 3,117,592 | 1/1964 | Abbey | 137/614.03 |
| 3,289,699 | 12/1966 | Westveer | 137/614.03 |
| 3,460,801 | 8/1969 | Norton. | |
| 3,537,478 | 11/1970 | Evans | 137/614.04 |
| 3,559,678 | 2/1971 | Donner. | |
| 3,994,317 | 11/1976 | Miyazaki et al. | 137/614.03 |
| 4,098,292 | 7/1978 | Evans | 137/614.04 |
| 4,361,127 | 11/1982 | Fukuhara | 137/543.17 X |
| 4,378,028 | 3/1983 | Weber | 137/614.04 X |
| 4,535,808 | 8/1985 | Johanson | 251/337 X |

Primary Examiner—Robert G. Nilson
Attorney, Agent, or Firm—Fay, Sharpe, Beall, Fagan, Minnich & McKee

[57] ABSTRACT

A poppet type valve assembly comprising a body having an axial bore extending therethrough and defining a fluid flow passage and an internal, generally cylindrical valve chamber. Seat means are carried in the bore adjacent a first end of the valve chamber to define a valve seat coaxial with the bore. A poppet valve member is mounted in the chamber for movement axially thereof toward and away from the seat. Extending axially of the chamber is a coil spring for maintaining the poppet valve member under a continual bias toward the seat. Valve stop means are provided for limiting movement of the poppet valve member in a direction away from the valve seat. The valve stop means including a central body portion having a plurality of legs which extend radially between a shoulder and the coil spring. A central body portion of the stop extends axially into the coil spring toward the poppet valve member a distance such that movement of the poppet valve away from the seat is stopped before the coil spring is fully compressed.

8 Claims, 4 Drawing Figures ized by a coil spring axially aligned with both the
POPPET VALVE

BACKGROUND OF THE INVENTION

The subject invention is directed toward the art of valves and, more particularly to an improved poppet valve assembly.

The invention is particularly suited for use in the female coupling portion of a quick connect coupling of the type shown in commonly assigned U.S. Pat. No. 4,378,028, issued Mar. 29, 1983, and will be described with particular reference thereto. However, as will become apparent, the invention is capable of broader application and can be used in a variety of poppet type check valves and quick connect couplings.

In the above mentioned U.S. Pat. No. 4,378,028 there is disclosed a quick connect coupling in which cooperating male and female coupling components are releasably joined by latch balls. The female coupling component includes a spring biased poppet valve element which is moved to its open position against the spring bias by insertion of the male coupling component.

In the coupling under discussion, the valve element is biased by a coil spring axially aligned with both the valve element and a valve chamber opening. In addition, the spring is mounted in a position circumferentially of the opening. Under certain conditions of fluid pressure and velocity in excess of those for which the valve is designed, the coil spring is compressed to a solid condition and/or the valve element shifts to a position where flow through the opening is seriously impaired or blocked.

BRIEF DESCRIPTION OF THE INVENTION

The subject invention provides a simple arrangement for overcoming the noted problem. Through the use of the invention, movement of both the poppet element and the spring are controlled and limited. Undesirable shifting of the valve element and blockage of flow are eliminated even under extremes of pressure and velocity.

In accordance with one aspect of the invention, there is provided a poppet type valve assembly that includes a valve body having a seat at one axial end and an axially aligned radially inwardly extending shoulder at the opposite axial end. A poppet valve member is positioned in the chamber and arranged for movement axially of the chamber between a closed position in engagement with the seat and an open position spaced from the seat in a direction toward the shoulder. A coil spring is positioned between the poppet valve member and the shoulder to maintain the valve member under a continual bias toward the seat. Valve stop means are provided for limiting movement of the valve toward the shoulder and providing guiding to the coil spring and the poppet valve member as the poppet valve member moves away from the seat. The stop means include a plurality of radially extending legs having end portions interposed between the coil spring and the shoulder. A central body portion is supported from the legs and extends axially toward the seat centrally of the coil spring. At least a portion of the stop means defines an end face which faces the seat for engaging the poppet valve at a predetermined point of movement away from the seat.

In accordance with a more limited aspect, the central body portion of the valve stop means extends toward the poppet valve member a distance such that movement of the poppet valve away from the seat is stopped before the coil spring is fully compressed.

In accordance with yet another object of the invention, the valve stop means is formed from planar members interconnected to present a generally X-shaped cross-section in planes perpendicular to the axis of the valve chamber. These members thus provide a plurality of flow passages centrally of the coil spring and aligned with the chamber opening.

As is apparent from the foregoing, the valve stop means can be an extremely simple structure which acts to both guide movement of the coil spring during its compression and limit the movement of the valve element while maintaining a free flow passage through the coil spring and the chamber opening.

In accordance with a still further object of the invention, the juncture between the legs and the central body portion of the valve stop means are configured to center the coil spring relative to the stop means. In addition, the portions of the legs which engage the shoulder are inclined so that the valve stop means is centered relative to the shoulder and the valve chamber outlet.

BRIEF DESCRIPTION OF THE DRAWINGS

The above and other objects and advantages will become apparent from the following detailed description when read in conjunction with the accompanying drawings wherein.

DETAILED DESCRIPTION OF A PREFERRED EMBODIMENT

Figure 1:
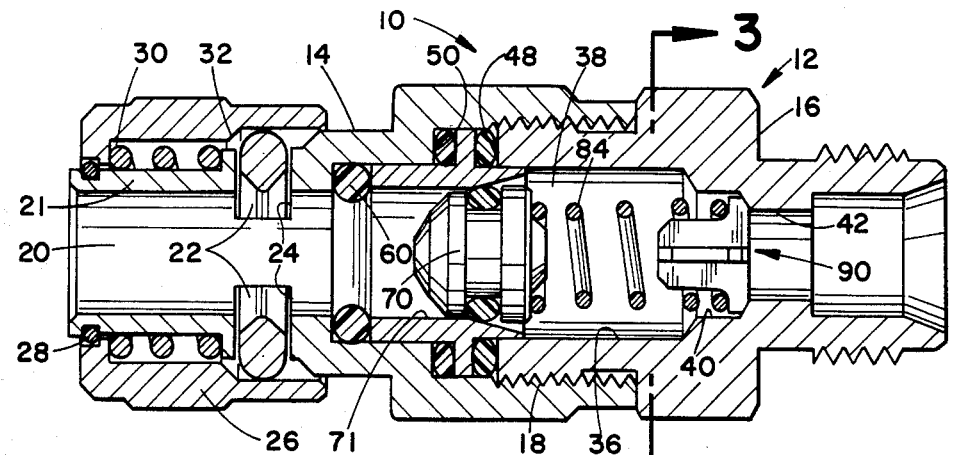
FIG. 1 is a longitudinal cross-sectional view through a poppet type valve assembly incorporating the subject invention.

Referring more particularly to the drawings where the showings are for the purpose of illustrating a preferred embodiment of the invention only and not for the purpose of limiting same, FIG. 1 shows the invention incorporated in a poppet type valve assembly 10. Assembly 10 of FIG. 1 is a female coupling component for a quick connect coupling of the type shown in commonly assigned U.S. Pat. No. 4,378,028, the disclosure of which is herein incorporated by reference.

The poppet valve assembly 10 is shown as including a main body 12 which is formed by a pair of main body sections 14 and 16 which are releasably interconnected by mating threads 18.

In the embodiment under consideration, body section 14 includes an axially extending bore 20 which is adapted to receive the male member of the male coupling assembly (not shown). Associated with the body section 14 and carried by the reduced diameter portion 21 are suitable locking dogs 22. As shown, the locking dogs are arranged so that they can extend inwardly of the reduced diameter portion 21 to the bore 20 through slots 24. An operating sleeve member 26 surrounds the reduced diameter end portion 21 and is retained thereon by a suitable snap ring 28. The operating sleeve 26 is continually biased to the left (as shown in FIG. 1) by a coil spring 30. In the left-hand position, the operating sleeve 26 allows the locking dogs 22 to move to the radially outermost position shown for receiving or releasing the cooperating male coupling member. As is discussed in the previously mentioned U.S. Pat. No. 4,378,028, when the male coupling member is fully received within the bore 20 the sleeve 26 is moved to the right against the bias of spring 30 by an operating portion of the male coupling member. This causes the locking dogs 22 to be cammed radially inwardly by the internal cam surface 32 of operating sleeve 26. This locks the male and female coupling components together. The joint coupling halves can be released by moving the corresponding operating sleeve on the male coupling component to the left and permitting the operating sleeve 26 to move to the left-hand position shown in FIG. 1 thereby allowing the locking dogs to move radially outward.

The body section 16 is, as previously mentioned, joined to section 14 by the threads 18. As shown, the body section 16 includes an axial bore 36 which defines an internal valve chamber 38. A reduced diameter counterbore 40 is formed at the right-hand end of bore 36 and connects with an outlet opening or bore 42. Body 16 is externally threaded about the right-hand end for connection to a tube or other component by conventional means known in the art.

For reasons which will subsequently be discussed, the juncture between the counterbore 40 and the bore or outlet passage 42 is tapered to provide a generally conically shaped shoulder 46.

Figure 2:
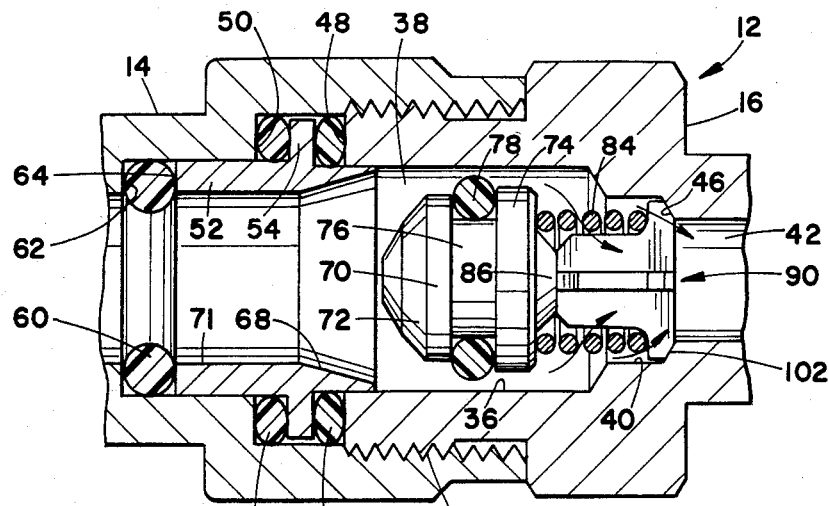
FIG. 2 is an enlarged cross-sectional view of the valve chamber portion of the FIG. 1 showing but with the valve element in a full open position.

As best shown in FIG. 2, an end of body 16 and an internally stepped area on body section 14 define a pair of spaced, radially extending shoulders 48 and 50, respectively. As shown, a hollow, generally cylindrical valve seat member 52 has a circumferentially extending outer flange 54 which is received between shoulders 48 and 50. Suitable O-rings 56 and 58 are positioned on opposite sides of flange 54 for engagement with shoulders 50 and 48, respectively. This arrangement provides a fluid tight seal between the body sections 14, 16 and the seat insert member 52. In addition, a suitable O-ring 60 is held between a shoulder 62 formed in bore 20 and an end face 64 on seat insert 52. O-ring 60 serves to seal about the male coupling component when it is inserted in bore 20 as previously described.

The right-hand end of seat insert 52 is preferably sized so as to be closely received within bore 36, as best shown in FIG. 2. The internal portion of the right-hand end is provided with an internally tapered surface 68 which provides the actual seat or sealing surface of the seat insert 52.

In the embodiment under consideration, the seat insert 52 defines the left-hand end of the valve chamber 38. Positioned within valve chamber 38 and arranged for movement between a sealing position shown in FIG. 1 and a full open position shown in FIG. 2 is a poppet valve element or member 70. Element 70 has a generally cylindrical configuration with a tapered end portion 72 having a maximum diameter to be closely received within the internal bore 71 of the seat insert 52 (as shown in FIG. 1). The right-hand end 74 of member 70 has a maximum outer diameter which is slightly larger than the internal bore 71 of the seat insert 52 and arranged so that it can engage the tapered seat area 68 in the maximum closed position of the valve element. A groove 76 is formed between portions 72 and 74 and receives a resilient, elastomeric O-ring 78. When the valve element is in its closed position the O-ring 78 is normally disposed in sealing relationship with the seat surface 68 in the manner shown in FIG. 1. Under extreme back pressure conditions or with wear of the O-ring 78 the enlarged diameter right-hand end portion 74 of the valve element can make metal-to-metal contact with the seal surface 68.

As can be appreciated, the poppet valve element 70 is maintained under a constant bias toward the seat member 52 by a coil spring 84 which extends coaxially of the valve chamber 38 between the poppet valve element and the previously mentioned shoulder 46. Preferably, the right-hand end face of the poppet valve element 70 includes an outwardly extending protrusion 86 which is received by and locates the valve element relative to the end of coil spring 84.

Figure 3:
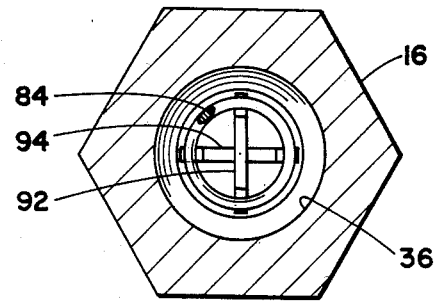
FIG. 3 is a cross-sectional view taken on line 3—3 of FIG. 1.
Figure 4:
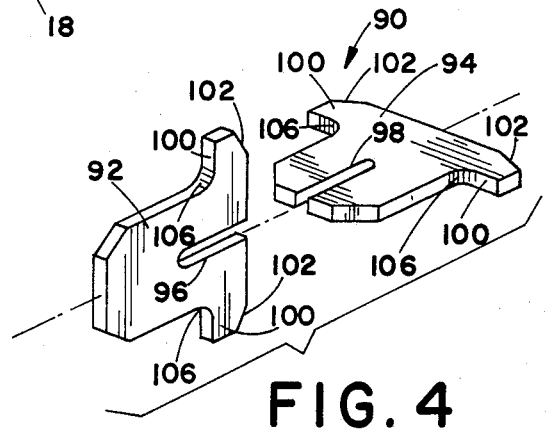
FIG. 4 is an exploded pictorial view of the valve stop means used in the FIG. 1 assembly.

Of particular importance to the subject invention is the arrangement provided for limiting the maximum open movement of the poppet valve element 70 while also centering and guiding the coil spring 84. In the form illustrated, this means comprises a valve stop member 90 constructed and configured, as best shown in FIG. 4. In particular, the valve stop means 90 comprises a pair of generally planar body halves 92 and 94 which are substantially identical in outer configuration. Each half 92, 94 includes an inwardly extending slot 96, 98, respectively. In addition, identically configured protrusions or legs 100 extend outwardly from the opposed side edges of halves 92, 94. Halves 92, 94 are received over each other through cooperation of the slots 96, 98 to form a generally X-shaped configuration in planes perpendicular to the longitudinal axis of the valve chamber, as best shown in FIG. 3. The leg portions 100 have a maximum radial extent such that they are closely received within the bore 40, as shown in FIG. 2. Additionally, the legs 100 preferably have tapered surfaces 102. The surfaces 102 preferably taper at an angle corresponding to the angle of incline of the shoulder 46. Thus, when the stop member is in position between the coil spring 84 and the shoulder 46 the cooperation between the inclined surfaces 102 and the surface 46 acts to center the stop member 90 axially of the valve chamber 38. In addition, the juncture between the legs 100 and the central body portion of each of the halves 92, 94 are preferably inclined or curved as shown at 106. This acts to center the spring 84 relative to the stop member 90.

As shown in FIG. 2, the central section of the stop means 90 extends axially into spring 84 a distance such that when the protrusions 86 on the poppet valve 70 engages the top surfaces of the stop means 90 the spring 84 is not fully collapsed or compressed and flow can take place between the spring coils and the plural passages defined by the stop member or means 90. Flow also can take place radially and axially between the legs 100.

In addition, it should be noted, that when in the maximum open position the right-hand end of the poppet valve element 70 is maintained a substantial distance away from the shoulder formed at the juncture between bores 36 and 40 so as to provide a full and free flow passage through this area. The relationship shown in FIG. 2 are maintained irrespective of the pressure acting against the face 72 of the poppet 70 or irrespective of the flow velocities taking place.

The invention has been described in great detail sufficient to enable one of ordinary skill in the art to make and use the same. Obviously, modifications and alterations of the preferred embodiment will occur to others upon a reading and understanding of the specification. It is our intention to include all such modifications and alterations as part of our invention insofar as they come within the scope of the appended claims.

Having thus described the invention, it is now claimed:

1. A poppet type valve assembly comprising:
 a body having an axial bore extending therethrough and defining a fluid flow passage and an internal, generally cylindrical valve chamber having first and second ends; seat means carried in said bore adjacent the first end of said valve chamber and defining a valve seat coaxial with said bore; shoulder means located at the second end of said valve chamber axially spaced from said seat and generally transverse to the axis of said valve chamber;
 a poppet valve member mounted in said chamber for movement axially thereof toward and away from said seat;
 a coil spring extending axially of said chamber for maintaining said poppet valve member under a continual bias toward said seat;
 valve stop means mounted in said chamber for limiting movement of said poppet valve member in a direction away from said valve seat; said valve stop means including a central body portion having a plurality of radial legs, said legs extending radially to a position between said shoulder means and said coil spring and said central body portion extending axially into said coil spring toward said poppet valve member, at least a portion of said stop means extending axially toward said poppet valve member a distance such that movement of said poppet valve away from the seat is stopped before said coil spring is fully compressed;
 said shoulder means comprising a counterbore formed in said chamber, said counterbore having a generally conical bottom wall; and,
 said legs having inclined surfaces engaged with the conical bottom wall of said counterbore to produce a centering action on said stop member.

2. The poppet valve assembly of claim 1 wherein said stop member has a generally X-shaped in planes perpendicular to said axis.

3. The poppet valve assembly of claim 1 wherein said legs of said stop means extend radially a distance at least nearly as great as the diameter of said coil spring.

4. The poppet valve of claim 1 wherein the central body portion of said stop means joins said legs with a surface configured for centering said stop means in said coil spring.

5. A poppet type valve assembly comprising:
 a body having an axial bore extending therethrough and defining a fluid flow passage and an internal, generally cylindrical valve chamber having first and second ends; seat means carried in said bore adjacent the first end of said valve chamber and defining a valve seat coaxial with said bore; shoulder means located at the second end of said valve chamber axially spaced from said seat and generally transverse to the axis of said valve chamber;
 a poppet valve member mounted in said chamber for movement axially thereof toward and away from said seat;
 a coil spring extending axially of said chamber for maintaining said poppet valve member under a continual bias toward said seat;
 valve stop means mounted in said chamber for limiting movement of said poppet valve member in a direction away from said valve seat; said valve stop means including a central body portion having a plurality of radial legs, said legs extending radially to a position between said shoulder means and said coil spring and said central body portion extending axially into said coil spring toward said poppet valve member, at least a portion of said stop means extending axially toward said poppet valve away from the seat is stopped before said coil spring is fully compressed; and,
 wherein said stop means is formed by a pair of generally planar members joined by cooperating slots extending axially of said chamber.

6. The poppet type valve assembly of claim 5 wherein said planar members have substantially identical outer configurations.

7. The poppet type valve assembly of claim 5 wherein said planar members each define a pair of said legs.

8. The poppet type valve assembly of claim 5 wherein each of said planar members have a portion which extends into said coil spring.

* * * * *